United States Patent [19]

Pitzer et al.

[11] Patent Number: 5,066,473

[45] Date of Patent: * Nov. 19, 1991

[54] SILICON NITRIDE POWDERS OF LOW ISOELECTRIC POINT AND PROCESSES FOR THEIR PRODUCTION

[75] Inventors: Ulrike Pitzer; Gerhard Franz; Benno Laubach, all of Krefeld, Fed. Rep. of Germany

[73] Assignee: Bayer Aktiengesellschaft, Leverkusen-Bayerwerk, Fed. Rep. of Germany

[*] Notice: The portion of the term of this patent subsequent to Jan. 8, 2008 has been disclaimed.

[21] Appl. No.: 579,236

[22] Filed: Sep. 4, 1990

Related U.S. Application Data

[63] Continuation of Ser. No. 396,330, Aug. 21, 1989, abandoned.

[30] Foreign Application Priority Data

Aug. 31, 1988 [DE] Fed. Rep. of Germany ....... 3829502

[51] Int. Cl.$^5$ ............................................. C01B 21/068
[52] U.S. Cl. ......................................... 423/344; 501/97
[58] Field of Search ........................... 423/344; 501/97

[56] References Cited

U.S. PATENT DOCUMENTS 4,284,432 8/1981 Nishida et al. .................... 423/344
4,341,874 7/1982 Nishida et al. .................... 501/97

FOREIGN PATENT DOCUMENTS 0251322 1/1988 European Pat. Off. .

OTHER PUBLICATIONS

Ceramic Transactions "Dispersions of Silicon Nitride Powders in an Aqueous Medium", 1988, vol. 1, pp. 477–484.

M. J. Crimp et al.; "Science of Ceramic Chemical Processing", 1986 pp. 539–549, Colloids Behavior of Silicon Carbide and Silicon Nitrides.

"Controlling the Oxygen Content of $Si_3N_4$ Powders", C. Greskovich et al., Schenectady, N.Y., 1980, pp. 1155–1156.

"Probleme der Feinstpulverherstellung für Mechanokeramik durch Mechanische Aufbereitung" 1988.

C. Greskovich, S. Prochazka, and J. H. Rosolowski, "Basic Research on Technology Development for Sintered Ceramics", Tech. Rep. No. AFML TR-76-179 General Electric Co., Schenectady, N.Y., 1976.

Primary Examiner—Olik Chaudhuri
Assistant Examiner—George R. Fourson
Attorney, Agent, or Firm—Connolly & Hutz

[57] ABSTRACT

Silicon nitride powder having a total oxygen content of less than 1.8% by weight and an isoelectric point in 0.001M aqueous $KNO_3$ solution of below pH 4 is prepared by calcining $Si_3N_4$ powder having an oxygen content of 0.4% by weight or less in an oxygen containing atmosphere at temperatures between 700° and 1200° C. for 15 to 90 minutes or by grinding such as $Si_3N_4$ powder in water, lower alcohol or a water/alcohol mixture for 15 to 120 minutes.

3 Claims, 1 Drawing Sheet

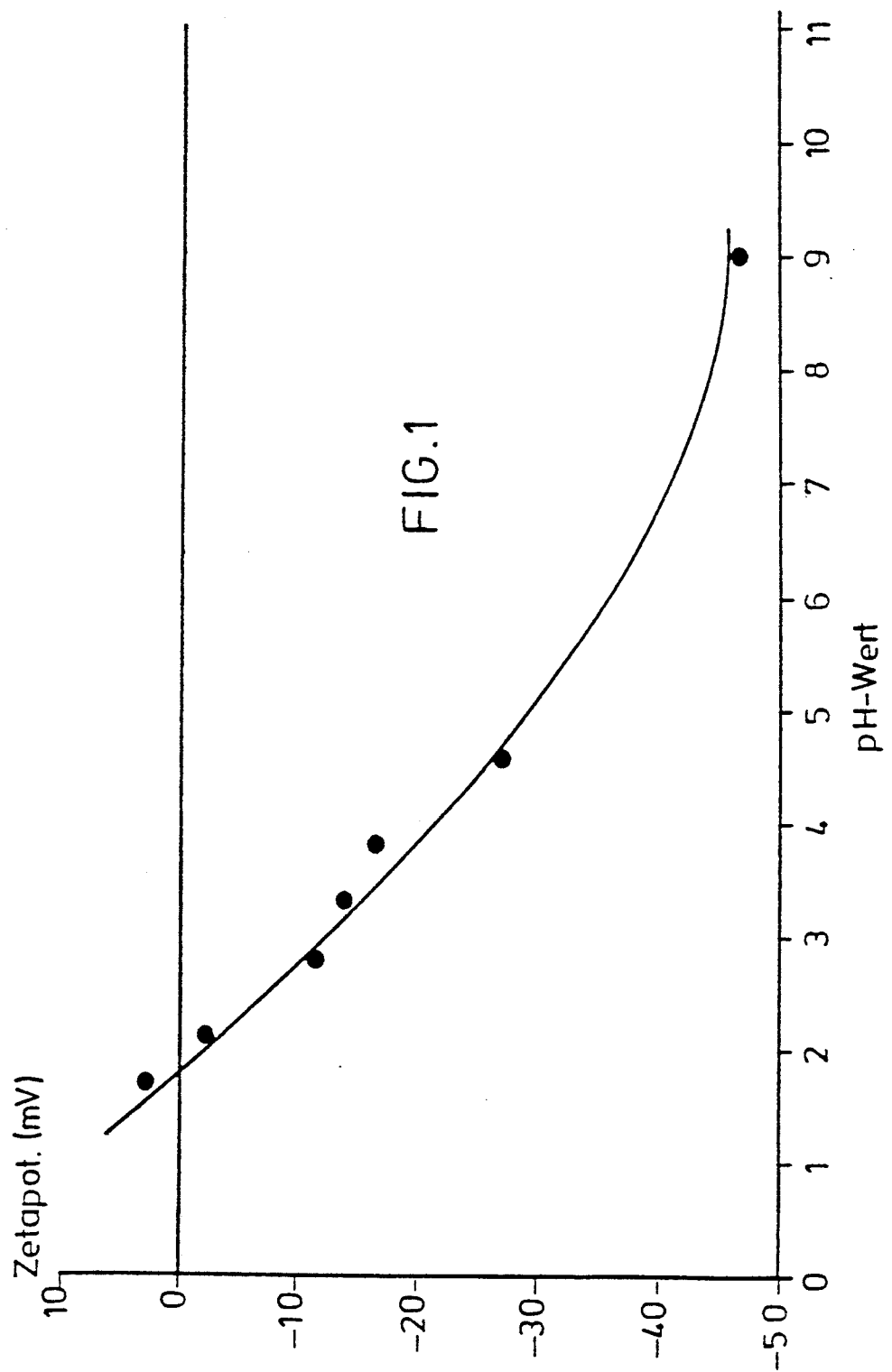

SILICON NITRIDE POWDERS OF LOW ISOELECTRIC POINT AND PROCESSES FOR THEIR PRODUCTION

This application is a continuation of application Ser. No. 07/396,330, filed Aug. 21, 1989, now abandoned.

This invention relates to $Si_3N_4$ powders having a total oxygen content of less than 1.8% by weight and to processes for their production

BACKGROUND OF THE INVENTION

In the production of components of $Si_3N_4$ ceramic, powders are prepared in a first step and are then converted by suitable molding techniques into so-called green compacts which are sintered to the final ceramic in a further step. In addition to compression molding and injection molding, slip casting has proved more and more to be a suitable molding process in recent years. Slip casting has the advantage that it can be carried out using a suspension in which the powder particles are present in completely deagglomerated form, whereas compression molding in particular has to be carried out with finely divided, dry powders which inevitably form agglomerates. Even after sintering, however, agglomerates in the powder can still have adverse effects by reducing the strength and reliability of the component (J. P. Torre, Y. Bigay, Ceram. Eng. Sci. Proc. 7 (1986), 893-899).

The most important step in slip casting is the preparation of a stable, deflocculated dispersion of the $Si_3N_4$ powder particles in the solvent, i.e. generally in water. To eliminate the effect of small, but uncontrolled ion concentrations, a certain ion strength is generally established by the addition of defined salts. The process is generally carried out in dilute (0.001M) $KNO_3$ solution. However, unwanted flocculation often occurs in these suspensions. This is prevented by addition of organic dispersion aids.

However, it is known in the case of $Si_3N_4$ that both the powder and the green compact should be free from carbon (G. Ziegler, J. Heinrich, G. Wötting, J. Mater. Sci. 22 (1987), 3041-3086). Accordingly, it is a disadvantage to stabilize $Si_3N_4$ suspensions by addition of organic dispersion aids because residues of carbon from the dispersion aid can remain behind in the compact after molding.

After molding by slip casting, the finished ceramic component is produced from the green compact by sintering. High sintering densities presuppose a certain content of oxygen in the $Si_3N_4$ powder. On the other hand, however, the oxygen content should not be too high because high oxygen contents reduce the strength values at high temperatures (G. Ziegler, J. Heinrich, G. Wötting, J. Mater. Sci. 22 (1987), 3041-3086). A total oxygen content of 1.5% by weight is regarded as optimal. If the oxygen content exceeds 1.8% by weight, the high-temperature properties can be expected to deteriorate.

Now, the object of the present invention is to provide $Si_3N_4$ powders which have a total oxygen content of less than 1.8% by weight and good dispersion properties.

BRIEF DESCRIPTION OF THE INVENTION $Si_3N_4$ powders having a total oxygen content of less than 1.8% by weight, which satisfy these requirements, have now been found. When dispersed in 0.001M $KNO_3$ solution without additions of dispersion aids, they have an isoelectric point of less than pH 4. Powders such as these are new because, hitherto, various $Si_3N_4$ powders have only ever been known to show zeta potential curves in which the isoelectric point (IEP) is above pH 4 to pH 8 (R. de Jong, R. A. McCauley in: Ceramic Transactions, Vol. 1 (1988), 477-484).

BRIEF DESCRIPTION OF THE DRAWINGS

FIG. 1 illustrates a graph of the zeta potential curve as a function of the pH value of a silicon nitride according to the present invention.

DETAILED DESCRIPTION OF THE INVENTION

The present invention relates to silicon nitride powder having a total oxygen content of less than 1.8% by weight and having an isolectric point in 0.001M aqueous $KNO_3$ solution of below pH 4 and processes for its production.

The $Si_3N_4$ powders according to the invention may be obtained by starting out from a powder which has an extremely low total oxygen content. Powders such as these and processes for their production are the subject of copending U.S. application Ser. No. 396,328, filed Aug. 21, 1989, now U.S. Pat. No. 4,983,371. The $Si_3N_4$ powders used should have an oxygen content of or less than 0.4% by weight.

The present invention also relates to processes for the production of the $Si_3N_4$ powders according to the invention. One possible process according to the invention is characterized in that $Si_3N_4$ powder having a total oxygen content of 0.4% by weight or less is calcined in an oxygen-containing atmosphere for 15 minutes to 90 minutes at a temperature in the range from 700° to 1200° C. The fact that oxidation of the powder surface leads to a reduction in the isoelectric point to below pH 4 is all the more surprising in so far as it may be assumed that an oxidizing heat treatment has only a negligible effect on the zeta potential curve and hence the isoelectric point of $Si_3N_4$ suspensions (M. J. Crimp, R. E. Johnson, J. W. Halloran, D. L. Feke in: Science of Ceramic Chemical Processing (1986), 539-549). If the total oxygen content is higher than 0.4% by weight, the following steps can only be controlled with considerable technical effort in such a way that the required final oxygen content no longer exceeds 1.8% by weight, particularly where the powders are very finely divided and hence reactive.

Because silicon nitride is thermodynamically unstable to silicon dioxide, it had been expected that silicon nitride powder having a low oxygen content would be able to be oxidized and hydrolyzed very easily until a passivation layer slightly inhibited the reaction after a time. However, it has surprisingly been found that powders having a total oxygen content of 0.4% by weight or less react very sluggishly to oxidation and hydrolysis reactions, so that it is technically readily possible in their case to oxidize the powder surface and hence to reduce the isoelectric point by dispersion in 0.001M $KNO_3$ solution. On the one hand, low-oxygen $Si_3N_4$ powders can be surface-oxidized by calcining them in air for 15 minutes to 90 minutes at temperatures in the range from 700° C. to 1200° C. If the times are too short or the temperatures too low in the process according to the invention, the isoelectric point is situated at pH values above 4. If the times are too long or the temperatures too high, the oxygen content can rise above 1.8% by weight. Depending on the oxygen content of the starting material, therefore, time and temperature have to be optimized to obtain the desired $Si_3N_4$ powder in which the total oxygen content is less than 1.8% by weight and the isoelectric point on dispersion in 0.001M $KNO_3$ solution is lower than pH 4.

In another preferred embodiment, the powder according to the invention may be produced by grinding $Si_3N_4$ powder having an oxygen content of 0.4% by weight or less for 15 minutes to 120 minutes in water and/or alcohols.

The alcohols useful in this process are the lower alcohols which are miscible with water and include alcohols having 1 to 4 carbon atoms. Normally, $Si_3N_4$ powders are not ground in water, but in organic solvents, because otherwise the oxygen content can rise to an excessively high value (B. Hoffmann, Keramische Zeitschrift 40(2) (1988), 90-96). However, if powders of very low oxygen content are used as starting material, it is possible by optimization of the grinding time to keep the oxygen content below 1.8% by weight and, at the same time, to achieve an isoelectric point of less than pH 4 where the powder is dispersed in 0.001M $KNO_3$ solution.

The total oxygen content of the $Si_3N_4$ powder is determined by the method of hot extraction in an inert carrier gas stream. An $Si_3N_4$ sample is weighed into a graphite crucible and heated to beyond 1800° C. in a stream of helium. The oxygen present in the sample is reacted to CO which is quantitatively determined by means of an IR measuring cell.

The zeta potential curve as a function of the pH value is determined by measuring the electrokinetic mobility. The various pH values are established by addition of $HNO_3$ and KOH. The isoelectric point is situated at the pH value at which the zeta potential is zero. To keep the effect of ion strength on the zeta potential curve constant, the measurement is carried out in 0.001M aqueous $KNO_3$ solution.

The following Example is intended to illustrate the $Si_3N_4$ powders according to the invention and their production processes without limiting them in any way:

EXAMPLE 12.3 g $Si_3N_4$ powder having a total oxygen content of 0.22% by weight, which was obtained in accordance with Example 2 of copending U.S. application Ser. No. 396,328, filed Aug. 21, 1989, now U.S. Pat. No. 4,983,371, are calcined in air for 1 hour at 1000° C. in a tube furnace. The increase in weight is less than 0.1 g.

The total oxygen content of the calcined powder is determined by the hot gas extraction method and measures 0.45% by weight.

The calcined powder is dispersed in 0.001M aqueous $KNO_3$ solution and the zeta potential curve is determined as a function of the pH value (FIG. 1). The various pH values are established with $HNO_3$ and KOH. The isoelectric point is at pH 1.9.

What is claimed is:

1. Silicon nitride powder having a total oxygen content of less than 1.8% by weight and an isoelectric point in 0.001M aqueous $KNO_3$ solution of below pH 4.

2. Silicon nitride having a total oxygen content of less that 1.8% by weight and having an isoelectric point in 0.001M aqueous $KNO_3$ solution of below pH 4, prepared by calcining $Si_3N_4$ powder having a total oxygen content of 0.4% by weight or less in an oxygencontaining atmosphere for 15 to 90 minutes at a temperature between 700° C. and 1200° C.

3. Silicon nitride having a total oxygen content of less than 1.8% by weight and having an isoelectric point in 0.001M aqueous $KNO_3$ solution of below pH 4, prepared by grinding $Si_3N_4$ powder having a total oxygen content of 0.4% by weight or less for 15 to 120 minutes in water, alcohol or a water/alcohol mixture.

* * * * *